United States Patent
Bui et al.

(10) Patent No.: US 9,153,280 B2
(45) Date of Patent: *Oct. 6, 2015

(54) ADJUSTING TENSION IN A TAPE MEDIA TO COUNTER TAPE DIMENSIONAL STABILITY (TDS) ERRORS IN A TAPE MEDIA

(71) Applicant: International Business Machines Corporation, Armonk, NY (US)

(72) Inventors: Nhan X. Bui, Tucson, AZ (US); Reed A. Hancock, Tucson, AZ (US); Kevin B. Judd, Tucson, AZ (US)

(73) Assignee: GLOBALFOUNDRIES, INC., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 14/598,154

(22) Filed: Jan. 15, 2015

(65) Prior Publication Data
US 2015/0124348 A1   May 7, 2015

Related U.S. Application Data

(63) Continuation of application No. 13/887,136, filed on May 3, 2013.

(51) Int. Cl.
| | |
|---|---|
| G11B 5/02 | (2006.01) |
| G11B 15/43 | (2006.01) |
| G11B 5/52 | (2006.01) |
| G11B 15/467 | (2006.01) |
| G11B 5/55 | (2006.01) |
| G11B 5/012 | (2006.01) |
| G11B 20/18 | (2006.01) |

(52) U.S. Cl.
CPC .............. *G11B 15/43* (2013.01); *G11B 5/012* (2013.01); *G11B 5/52* (2013.01); *G11B 5/5504* (2013.01); *G11B 15/4678* (2013.01); *G11B 20/18* (2013.01)

(58) Field of Classification Search
None
See application file for complete search history.

(56) References Cited

U.S. PATENT DOCUMENTS

| | | | |
|---|---|---|---|
| 6,545,834 B1 | 4/2003 | Melbye | |
| 6,563,659 B1 | 5/2003 | Fasen | |
| 6,934,108 B2 | 8/2005 | Harper et al. | |
| 7,395,983 B1* | 7/2008 | Saliba | ............... 360/132 |
| 7,764,460 B2 | 7/2010 | Bates et al. | |

(Continued)

FOREIGN PATENT DOCUMENTS

| | | |
|---|---|---|
| DE | 3903164 | 8/1990 |
| JP | 10124959 | 5/1998 |

(Continued)

OTHER PUBLICATIONS

Computer English translation for Japanese Publication No. JP10124959 dated May 15, 1998 by Sony Corp.

(Continued)

*Primary Examiner* — Muhammad N Edun
(74) *Attorney, Agent, or Firm* — David W. Victor; Konrad Raynes Davda & Victor LLP (57) ABSTRACT

Provided are a method, system, and program for adjusting tension in a tape media to counter tape dimensional stability (TDS) errors in a tape media. A determination is made of whether to adjust tension of the tape media based on a detected error rate of reading at least one of the tracks. The tension of the tape media is adjusted in response to determining to adjust the tension.

18 Claims, 8 Drawing Sheets

(56) References Cited

U.S. PATENT DOCUMENTS

| | | | |
|---|---|---|---|
| 8,089,716 B2 | 1/2012 | Takayama et al. | |
| 8,094,402 B2 * | 1/2012 | Bui et al. | 360/71 |
| 8,891,197 B2 | 11/2014 | Hancock et al. | |
| 2008/0239544 A1 | 10/2008 | Saliba | |
| 2011/0170214 A1 | 7/2011 | Bui et al. | |
| 2013/0272313 A1 | 10/2013 | Hathorn et al. | |
| 2014/0327985 A1 | 11/2014 | Bui et al. | |

FOREIGN PATENT DOCUMENTS

| | | |
|---|---|---|
| JP | 2004348926 | 12/2004 |
| JP | 2005285196 | 10/2005 |
| JP | 2005285268 | 10/2005 |
| JP | 2009151851 | 7/2009 |

OTHER PUBLICATIONS

English machine translation for Japanese Publication No. JP2005285196 dated Oct. 13, 2005 by Sony Corp.

English machine translation for Japanese Publication No. JP2005285268 dated Oct. 13, 2005 by Sony Corp.

English machine translation for Japanese Publication No. JP2009151851 dated Jul. 9, 2009 by Sony Corp.

PCT International Search Report and Written Opinion dated Jul. 16, 2014, pp. 12, for Application No. PCT/CN2014/075087 filed Apr. 10, 2014.

Information Materials for IDS dated Jul. 18, 2014, pp. 2, Application No. PCT/CN2014/075087 filed Apr. 10, 2014.

English translation for DE3903164 filed Aug. 9, 1990.

English translation for JP2004348926 filed Dec. 9, 2004.

Office Action dated Mar. 4, 2014, pp. 15, for U.S. Appl. No. 13/887,136, filed May 3, 2013.

Response dated Jun. 4, 2014, pp. 10, to Office Action dated Mar. 14, 2014, pp. 15, for U.S. Appl. No. 13/887,136, filed May 3, 2013.

Final Office Action dated Aug. 13, 2014, pp. 9, for U.S. Appl. No. 13/887,136, filed May 3, 2013.

Response dated Oct. 13, 2014, pp. 9, to Final Office Action dated Aug. 13, 2014, pp. 9, for U.S. Appl. No. 13/887,136, filed May 3, 2013.

Notice of Allowance dated Oct. 27, 2014, pp. 9, for U.S. Appl. No. 13/887,136, filed May 3, 2013.

* cited by examiner

ADJUSTING TENSION IN A TAPE MEDIA TO COUNTER TAPE DIMENSIONAL STABILITY (TDS) ERRORS IN A TAPE MEDIA

CROSS-REFERENCE TO RELATED APPLICATION

This application is a continuation of U.S. patent application Ser. No. 13/887,136, filed May 3, 2013, which application is incorporated herein by reference in its entirety.

FIELD OF THE INVENTION

The present invention relates to a computer program product, system, and method for adjusting tension in a tape media to counter tape dimensional stability (TDS) errors in a tape media.

DESCRIPTION OF THE RELATED ART

In the design of a tape drive system, the expansion and contraction of the magnetic tape may have to be taken into account. Such expansions and contractions of the magnetic tape cause a change in the dimension of the magnetic tape. Dimensional changes of the magnetic tape may be caused by environmental factors, aging of the magnetic tape, and other factors. For example, a magnetic tape may change its dimensions when exposed to different temperatures and humidity factors. Changes in the dimension of the magnetic tape may impact the successful reading of data that has been previously written on the tape under a different environment condition.

Tape Dimensional Stability (TDS) is a measure of the positional stability of the magnetic data tracks relative to each other and is a function of the tape properties and environmental effects such as temperature, humidity, tension, creep, etc. These environmental factors can cause the tape to expand or contract laterally, across the width of the tape. Therefore, when a tape is written to in one environmental condition and subsequently read from in another environmental condition, the position of the data tracks across the tape width can change enough to cause signal degradation or read errors. Minimizing tape dimensional changes may ensure the robustness of the reading data in a different environmental condition.

In a tape drive, a TDS condition may be detected by measuring vertical positions in the two servo channels on opposite sides of the data channel and determining the difference to find the TDS. The tape may be determined to have expanded if the upper vertical position in the servo channel is read below the reference position and determined to have contracted if the upper vertical position is determined to be above the reference upper vertical position. The middle read element of a tape head having multiple read elements may be positioned between the read upper and lower vertical positions in the servo channel.

SUMMARY

Provided are a method, system, and program for adjusting tension in a tape media to counter tape dimensional stability (TDS) errors in a tape media. A determination is made of whether to adjust tension of the tape media based on a detected error rate of reading at least one of the tracks. The tension of the tape media is adjusted in response to determining to adjust the tension.

DETAILED DESCRIPTION

Described embodiments provide techniques for using read error rates on the read elements on a tape head to determine whether the tape has contracted or expanded which could indicate TDS errors. Described embodiments adjust the tension of the tape media based on the read error rates experienced in the read elements.

Figure 1:
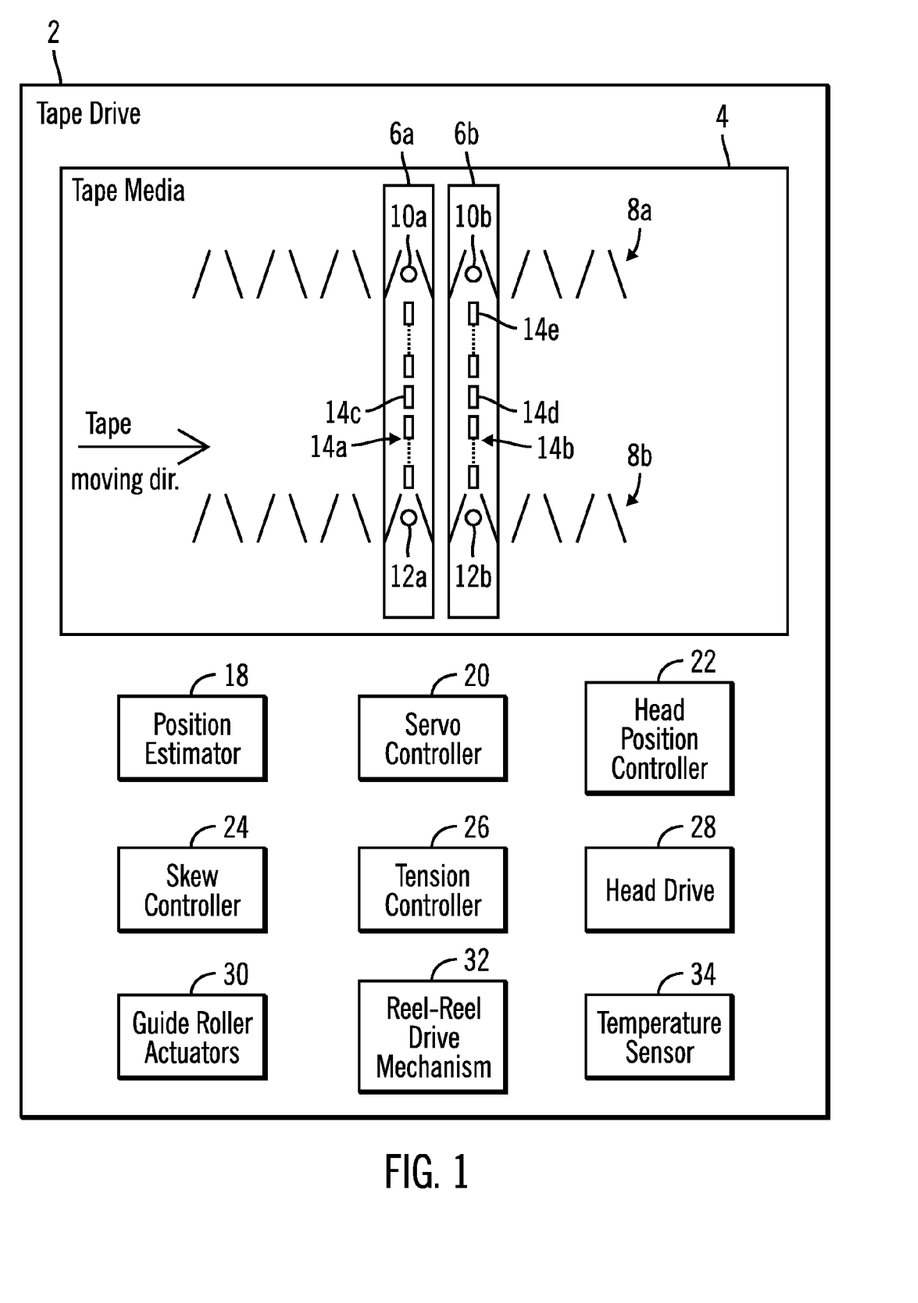
FIG. 1 illustrates an embodiment of a tape drive unit.

FIG. 1 illustrates an embodiment of a tape drive 2 unit to read a magnetic tape media 4 in a tape cartridge (not shown) inserted in the tape drive 2. The tape drive 2 includes a modular unit of heads 6a, 6b to write and read data written to the tape media 4. The tape media 4 includes servo bands 8a and 8b of servo patterns read by the heads 6a, 6b to determine the position of the heads 6a, 6b with respect to the tape media 4 to allow adjustment of the head position to write to the correct locations. Head 6a includes servo read elements 10a and 12a and a number of write and/or read elements 14a to read/write data on the tape media 4. Head 6b includes servo read elements 10b and 12b and a number of write and/or read elements 14b to read/write data on the tape media 4. The heads 6a and 6b may be manufactured within a Micro-electromechanical systems (MEMS) tape head. In certain embodiment, each head 6a, 6b may include 32 or some other number of read/write elements In one embodiment, read/write elements 14a include at least one write element 14c and read/write elements 14b include at least one read element 14d at a corresponding position on head 6b as the position of the at least one write element 14c on head 6a. Read element 14d on head 6b may read data written by write element 14c on head 6a, where the write 14c and read elements 14d are at corresponding positions on the heads 6a, 6b, so that a read following write operation can be performed. In further embodiments, the elements 14a and 14b may each include alternating read and write elements at corresponding positions. In one embodiment, if elements 14a include a write element at a position, the elements 14b would include a read element at the corresponding position and if elements 14b include a read element at a position, the elements 14b would include a write element at the corresponding position.

The elements on the read head 14b may comprise read elements, such that element 14d is a middle read element and read elements 14e and 14f are outer read elements furthest away from the middle read element 14c.

The tape drive 2 includes a position estimator 18, servo controller 20, head position controller 22, skew controller 24, tension controller 26, head drive 28, guide roller actuators 30, a reel-reel drive mechanism 32, and a temperature sensor 34 to measure a temperature within the tape drive 2. The position estimator 18 may process the servo read signals, read by the servo read elements servo read elements 10a, 10b, 12a, 12b, to produce position error signals (PES) provided to the head position controller 22 to move the heads 6a, 6b transversely, across the tape movement direction, to correct for position errors. As discussed, the heads 6a, 6b may be integrated in the same module so that the head drive 28 moves the integrated head module.

The servo controller 20 receives from the position estimator 18 the positions of the servo read elements 10a, 10b, 12a, 12b to calculate a skew error signal (SES), comprising an estimate of the skew angle of the tape media 4 relative to the heads 6a, 6b. The servo controller 20 supplies the SES to the skew controller 24 which supplies control signals to the guide roller actuators 30 to tilt guide rollers (not shown) in the tape media 4 path to counter tape skew. The servo controller 20 may further supply control signals to a tension controller 26. The tension controller 26 controls reel-to-reel drive mechanism 32 to adjust a motor moving the tape media 4 to counter tension variation.

The write elements 14a, 14b may write to tracks in one direction then wrap around and write in the opposite direction, writing tracks to different bands on the tape media 4. There may be multiple data bands and servo bands on the tape media 2 although only one data band and two servo bands 8a, 8b are shown.

As discussed, if there are TDS errors, the read heads 14b may read outside of the tracks due to the tape contracting or expanding so that the read heads can no longer maintain their position within the tracks on the tape due to expansion or contraction.

Figure 2:
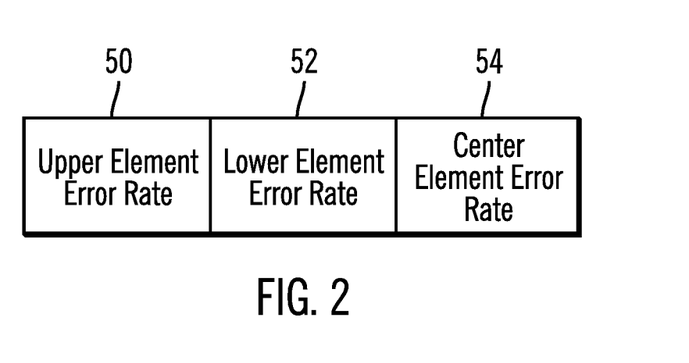
FIG. 2 illustrates error rate information gathered in the tape drive unit.

FIG. 2 illustrates an embodiment of information the servo controller 20 processes to determine whether to adjust the tension, including an upper element read error rate 50 comprising a read error rate measured at the upper read element 14e, a lower element read error rate 52 comprising a read error rate measured at the lower read element 14f, and a middle read element error rate 54 comprising a read error rate measured at the middle read element 14d. The read error rates 50, 52, 54 may be determined using error correction codes (ECC) to determine a rate at which errors are being read by the read elements 14d, 14e, 14f.

FIGS. 3-8 illustrate an embodiment of operations performed by the components of the tape drive unit 2 to determine whether to adjust the tension of the tape media 4 to compensate for TDS errors.

Figure 3:
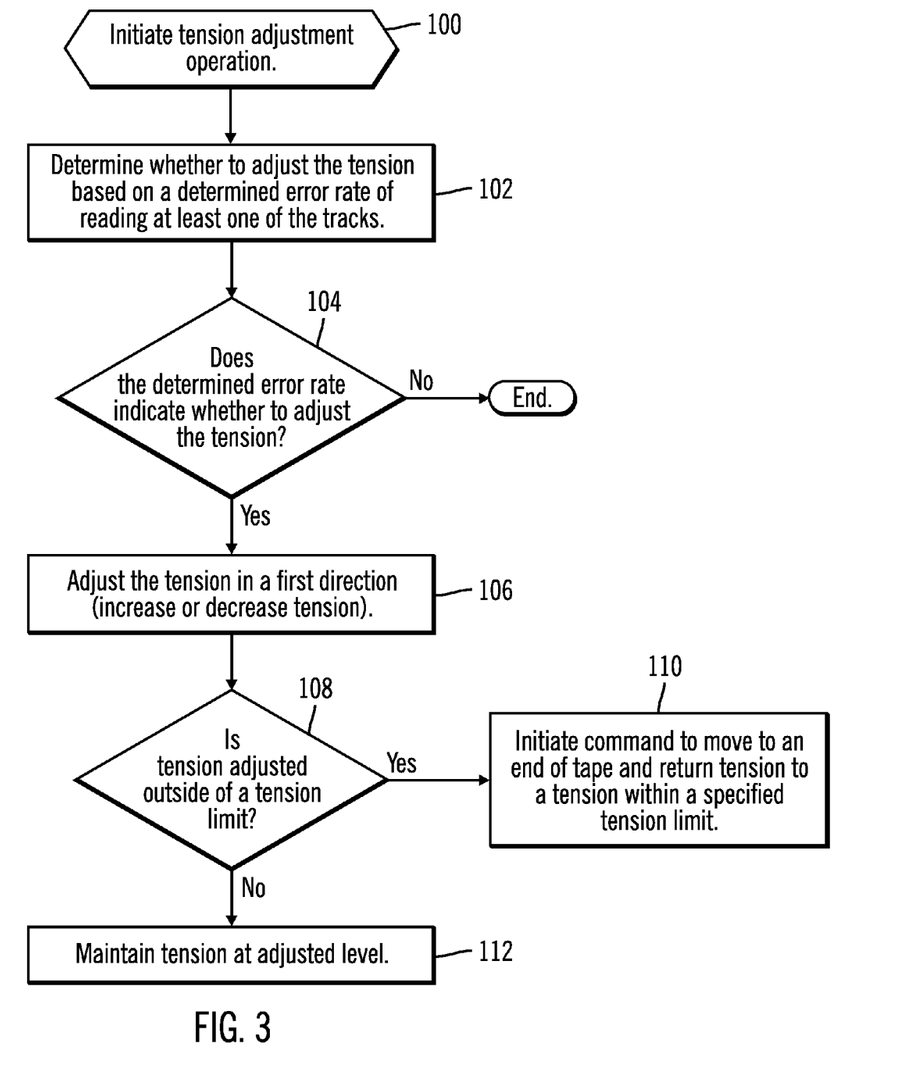
FIG. 3 illustrates an embodiment of operations to adjust the tension of the tape media in the tape drive unit.

FIG. 3 illustrates an embodiment of operations performed by the components of the tape drive 2, such as the position estimator 18, servo controller 20, and tension controller 26 to adjust the tension of the tape media for TDS errors. Upon initiating (at block 100) a tension adjustment operation, which may be initiated periodically, the servo controller 20 and other components determine (at block 102) whether to adjust the tension based on a determined read error rate of reading at least one of the tracks by one or more of the read elements 14d. In this way the read error rate of the outer read elements 14e, 14f and the middle read element 14d are used to indicate an extent of a TDS error. If the determined error rate indicates to adjust the tension, then the servo controller 20 sends a command to the tension controller 26 to adjust (at block 106) the tension a first direction, i.e., increase or decrease the tension. The tension adjustment direction may be based on a preselected tension adjustment or be based on a determination of whether the tape media 4 expanded or contracted, such as described with respect to FIGS. 7 and 8. If the determined read error rate does not indicate that the tension should be adjusted, i.e., indicate there is a TDS error, then control ends.

If (at block 108) the tension adjustment is outside of a tension limit, such as specified in a specification for the tape media 4, then the servo controller 20 initiates (at block 110) a command to move to an end of the current wrap in the tape media 4 and instruct the tension controller 26 to return to a tension within a specified tension limit, such as an initial default tension. If (at block 108) the tension adjustment is not outside the tension limit, then the tension is maintained (at block 112) at the adjusted level.

Figure 4:
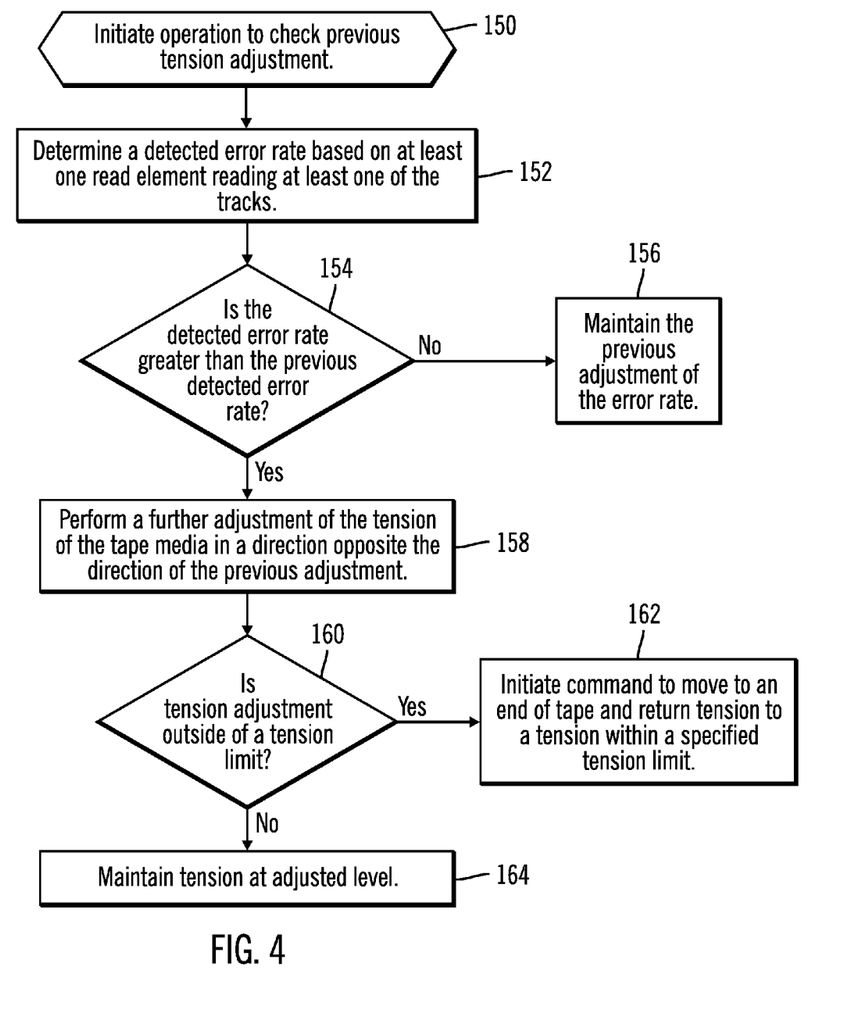
FIG. 4 illustrates an embodiment of operations to determine further adjustment of the tension.

FIG. 4 illustrates an embodiment of operations performed by the components of tape drive 2, such as the position estimator 18, servo controller 20, and tension controller 26 to check a previous tension adjustment. Upon initiating (at block 100) an operation to check a previous tension adjustment after adjusting the tension according to the operations of FIG. 3, a determination is made (at block 152) of a detected error rate resulting from one of the read elements 14b reading at least one of the tracks. If (at block 154) the detected error rate is less than the previous detected error rate resulting in the previous tension adjustment, then the servo controller 20 maintains (at block 156) the previous adjustment of the error rate, performed according to the operations of FIG. 3. If (at block 154) the detected error rate is greater than the previous detected error rate, meaning the error rate has worsened since the previous tension adjustment, then the servo controller 20 controls the tension controller 26 to perform (at block 158) a further adjustment of the tension of the tape media 6 in a direction opposite the direction of the previous tension adjustment. The previous and further determined error rates, tension adjustments, and directions of the adjustments may further be referred to as first and second error rates, tension adjustments and directions, or other terms to reference previous and current operations for adjustment.

For instance, if the first, i.e., previous, tension adjustment according to FIG. 3 increased or decreased the tension, then the second, i.e., current or further, adjustment according to FIG. 4 would reverse the first adjustment, by adjusting tension in the opposite direction, decrease or increase. To reverse the first adjustment, the second adjustment may be by a greater than the first adjustment to not only reverse the effect of the first adjustment, increase or decrease tension, but to change the tension in the opposite direction to reverse the tension adjustment beyond what the tension controller 26 applied before the first adjustment. If (at block 160) the second tension adjustment is outside of a tension limit, such as specified in a specification for the tape media 4, then the servo controller 20 initiates (at block 162) a command to move to an end of the current wrap in the tape media 64 and instruct the tension controller 26 to return to a tension within a specified tension limit, such as an initial default tension. If (at block 160) the second tension adjustment is not outside the tension limit, then the tension is maintained (at block 164) at the adjusted level.

In one described embodiment, the tension adjustment was to either increase or decrease the tension by a fixed value depending on whether the error rate increased since the previous tension adjustment. In a further embodiment, the second tension adjustment in the direction opposite the previous adjustment may be scaled based on an extent of the increase in the error rate, such that the amount of the second tension adjustment may vary depending on the magnitude of the increase in the error rate to provide greater resolution in controlling the subsequent tension adjustment. Further, the first or previous tension adjustment may also be scaled based on the magnitude of the first determined error rate to provide more fine tuned control of the tension adjustment.

Figure 5:
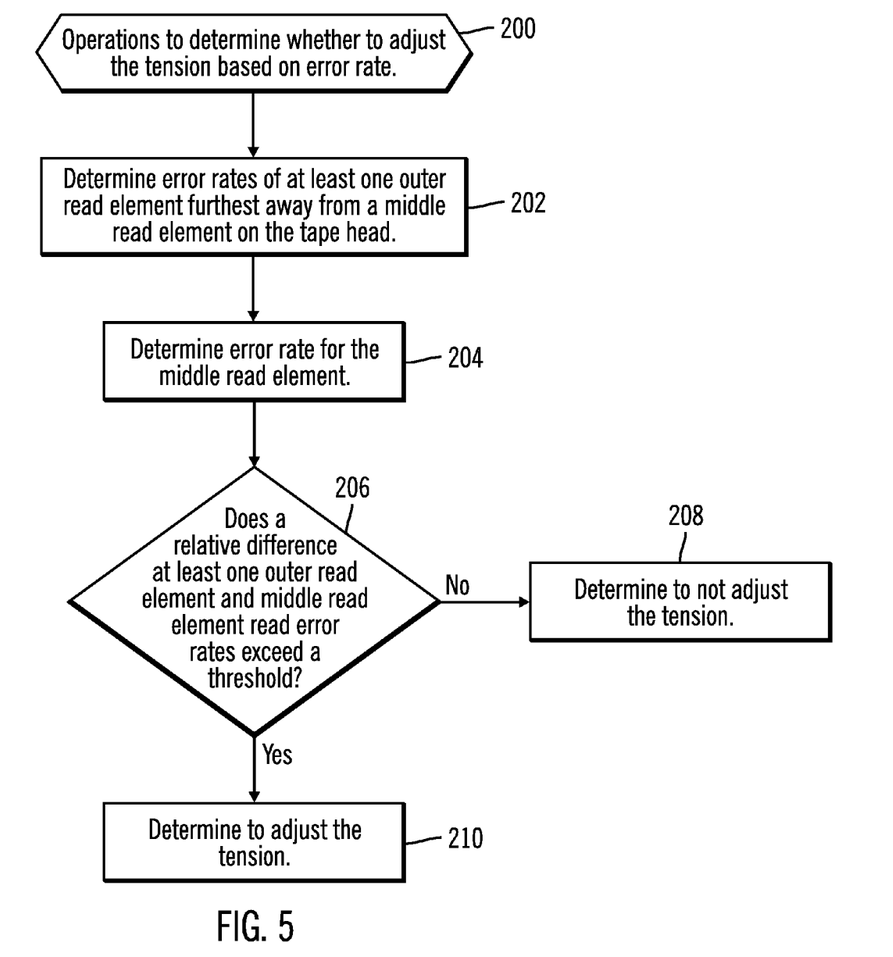
FIG. 5 illustrates an embodiment of operations to determine whether to adjust the tension based on an error rate.

FIG. 5 illustrates an embodiment of operations performed by the components of tape drive 2, such as the position estimator 18, servo controller 20, and tension controller 26 to determine whether to adjust the tension using a read error rate, which may comprise the operation performed at block 102 in FIG. 3. Upon initiating (at block 200) the operation to adjust the tension based on the read error rate, the servo controller 20 determines (at block 202) read error rates of at least one outer read element 14e, 14f furthest away from the middle read element 14e on the tape head 6b, and determines (at block 204) the error rate for the middle read element 14d. The servo controller 20 determines (at block 206) a relative difference of the read error rate experienced by at least one outer read element 14e, 14f and the middle read element 14d, to determine the extent to which the outer read error rates exceed the read error rate at the middle read element 14d. A higher error rate at the outer read elements 14e, 14f indicates that there has been expansion or contraction which affects the outer read channels more. If (at block 206) the relative difference in error rates does not exceed a threshold, then the determination is to not adjust the tension. If (at block 206) the relative difference does exceed the threshold, then the determination (at block 210) is to adjust the tension. If both the outer read element 14e, 14f read error rates are considered, then the determination may require that one or both measured error rates exceed the threshold to determine to adjust tension. As discussed the tension adjustment may comprise a fixed adjustment value or a tension adjustment amount that is scaled by the magnitude of the determined error rates.

Figure 6:
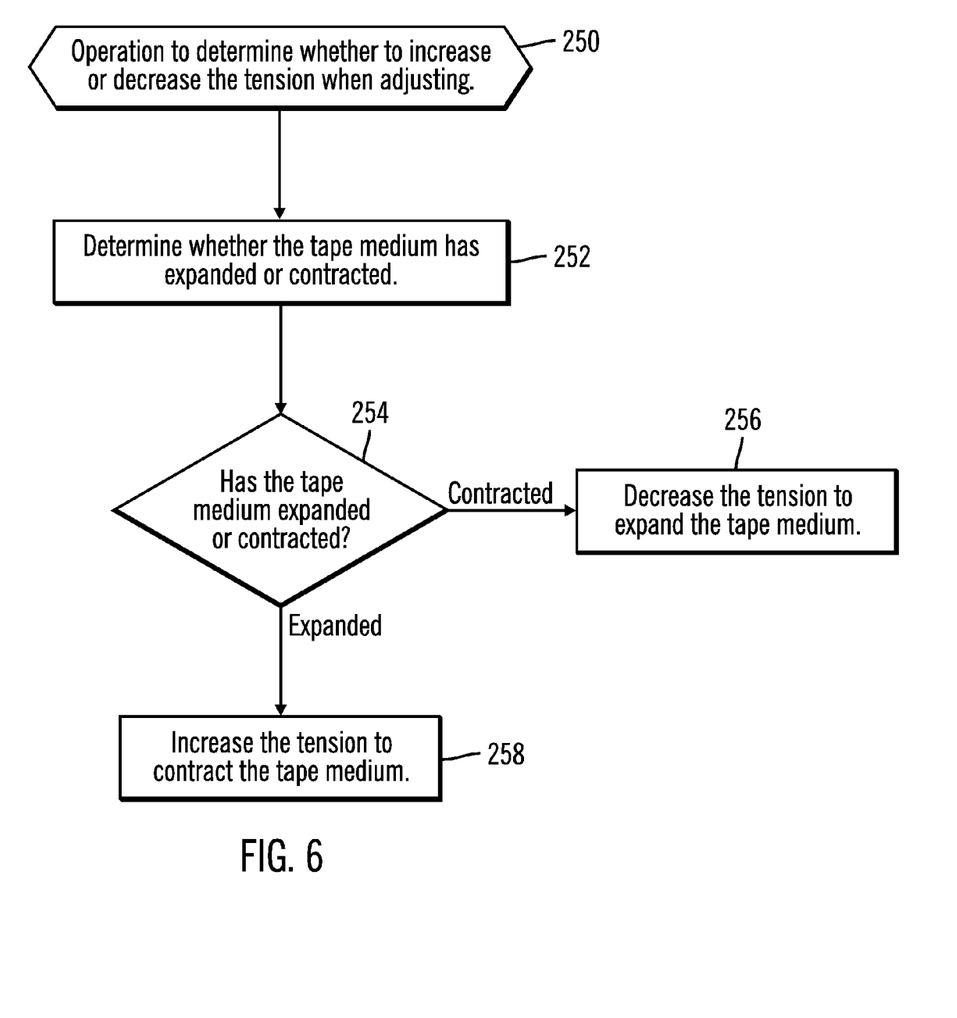
FIG. 6 illustrates an embodiments of operations to determine whether to increase or decrease the tension when adjusting.

FIG. 6 illustrates an embodiment of operations performed by the components of tape drive 2, such as the position estimator 18, servo controller 20, and tension controller 26, to determine whether tension should be increased or decreased in block 106 in FIG. 3. With respect to FIG. 6, upon initiating the operation (at block 250), the servo controller 20 determines whether the tape media 4 has expanded or contracted. If (at block 254) the tape media 4 has contracted, the tension controller 26 is signaled to decrease (at block 256) the tension to expand the tape medium 4. If (at block 254) the tape media 4 has expanded, then the tension is increased (at block 258) to contract the tape medium 26.

Figure 7:
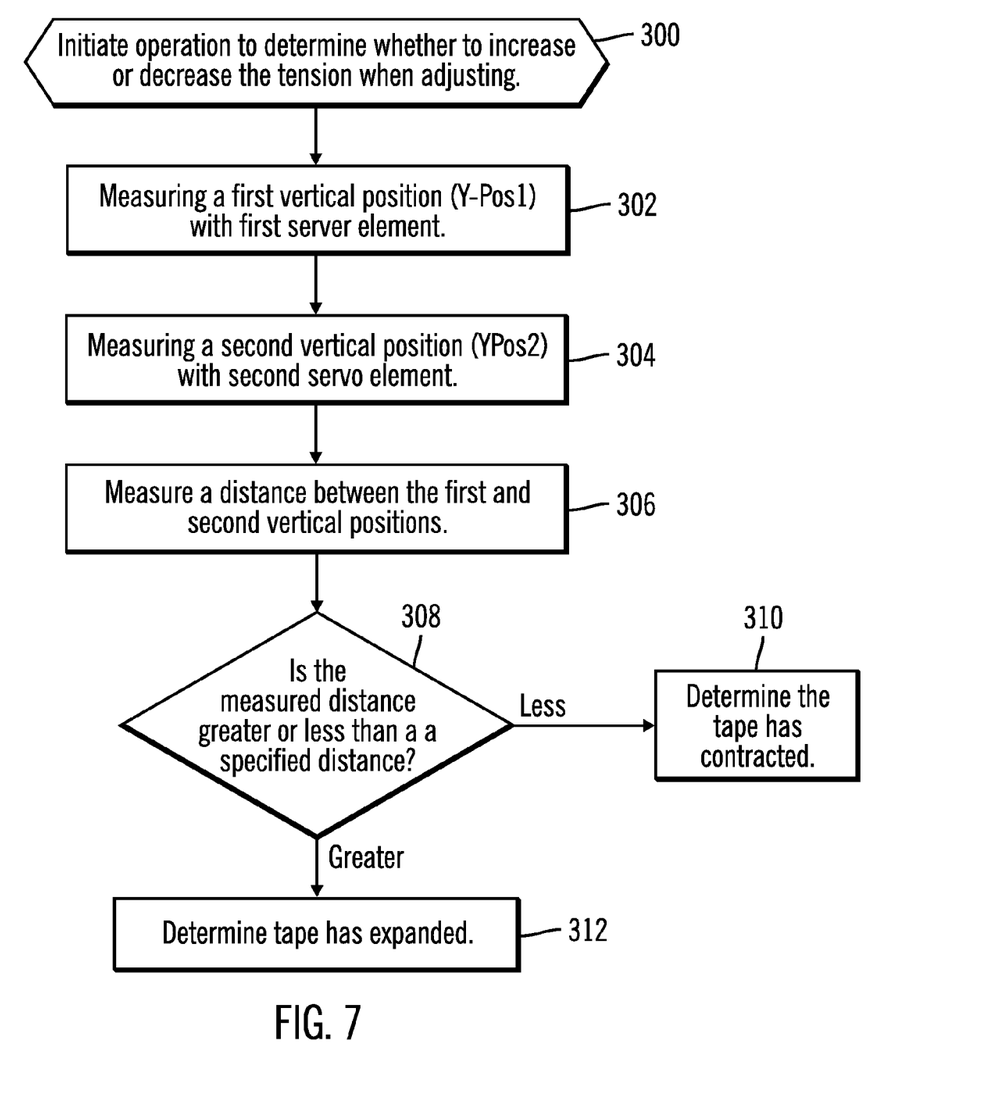
FIGS. 7 and 8 illustrate embodiments of operations to determine whether the tape media has contracted or expanded.
Figure 8:
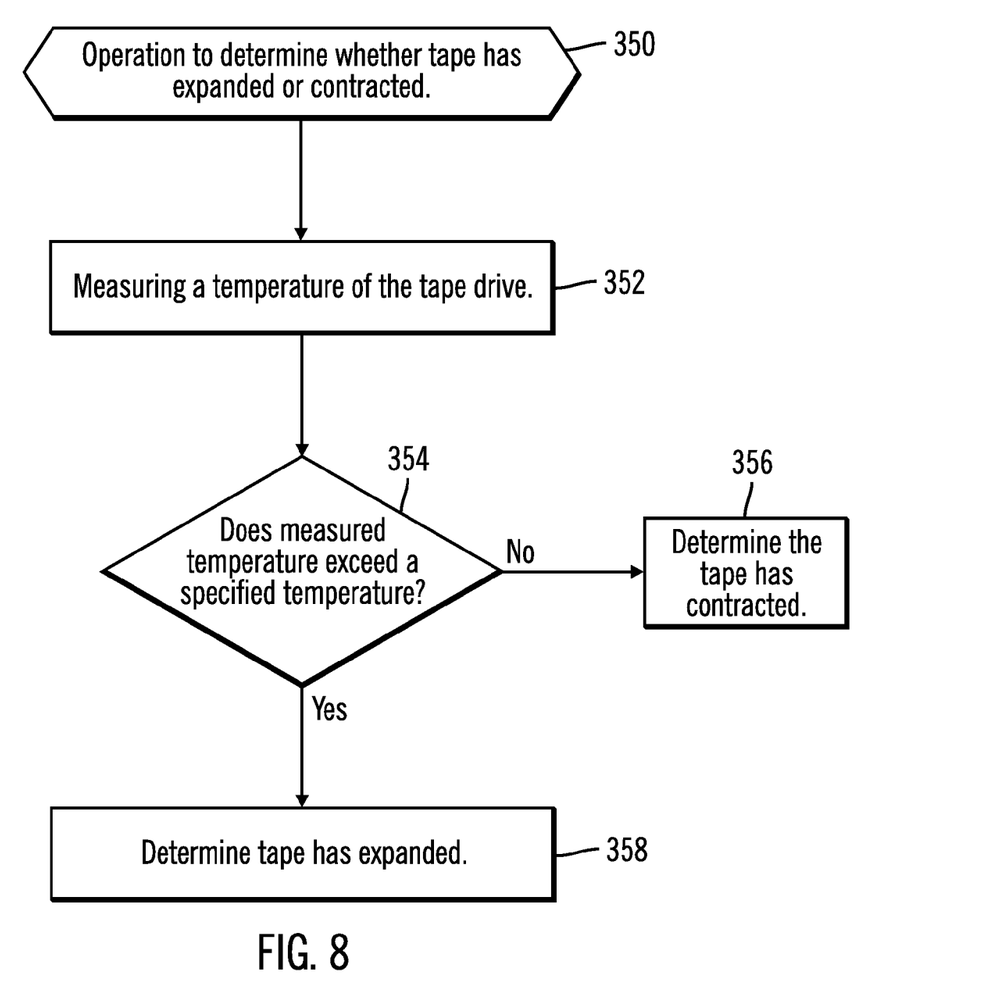

FIGS. 7 and 8 illustrate embodiments of operations performed by the components of the tape drive 2, such as the position estimator 18, servo controller 20, and tension controller 26, to determine whether the tape media 4 has expanded or contracted. This information may be used with respect to the operations in FIG. 6 when determining whether tension should be increased or decreased.

With respect to FIG. 7, upon initiating (at block 300) the operation to determine the direction in which to increase the tension, the position estimator 18 measures (at block 302) a first vertical position (Y-Pos1) with a first servo element 10b and measures (at block 304) a second vertical position (Y-Pos2) with a second servo element 12b determining whether to increase A distance between the two vertical positions (Y-Pos1 minus Y-Pos2) is measured (at block 306). If (at block 308) the measured distance is less than a specified or initial state distance for the servo positions, then the determination is that the tape has contracted (at block 310). Otherwise, if the distance is greater than the specified or initial distance, then the determination is that the tape has expanded (at block 312).

With respect to FIG. 8, upon initiating the operation (at block 350) to determine whether the tape has expanded or contracted, the servo controller 30 determines (at block 352) a measurement of a temperature of the tape drive 2 from the temperature sensor 34. If (at block 354) the measured temperature does not exceed a specified temperature, then a determination is made that the tape media 4 has contracted (at block 356), otherwise the tape media 4 is determined to have expanded (at block 358).

In a further embodiment, the tension is adjusted based on a default adjustment, either increase or decrease, and then there is a second adjustment if the read error rate does not improve. In this further embodiment, the adjustment is set to a default or random value not related to any effort to determine that the tape media 4 has expanded or contracted.

Described embodiments provide techniques to compensate for TDS tracking errors that occur due to tape expansion or contraction. Described embodiments, use an error rate, such as the read error rate at the outer read elements and middle read element, to determine whether errors are resulting from TDS phenomena, and then adjust the tension to accommodate for a TDS error to reverse the perceived expansion or contraction that has occurred.

The described logic of the components of the tape drive 2, including 18, 20, 22, 24, 26, 28, 30, 32, 34 may be implemented in hardware as discrete logic, such as an ASIC (application specific integrated circuit), FPGA (field programmable gate array), custom processors, etc.

The described logic of the components of the tape drive 2, e.g., 18, 20, 22, 24, 26, 28, 30, 32, 34, shown in FIG. 1 may alternatively be implemented in subroutines in programs or other software implementations executed by a processor. Such programs implementing the operations of the servo channel components described with respect to FIG. 1 may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

The described embodiments were described with respect to a tape drive 2 having heads 6a, 6b, implemented on an integrated head unit. In an alternative embodiment, the heads 6a, 6b may be on separately movable and controllable units. In alternative embodiments, the described embodiments may be used to adjust read and write heads for storage media other than tape, such as magnetic disk, optical storage, etc.

The components shown in FIG. 1 shown as separate components may be implemented in a single circuit device or functions of one illustrated component may be implemented in separate circuit devices. Moreover, operations described with respect to certain components, such as generating the interpolation time instants and correlating the data, may be performed by other components in the servo channel.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an Application Specific Integrated Circuit (ASIC), FPGA (field programmable gate array), custom processors, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for handling errors when reading data on a tape media having a plurality of tracks, the computer program product comprising a computer readable storage medium having computer readable program code embodied therein that executes to perform operations, the operations comprising:
   determining a first read error rate based on first read errors;
   determining a second read error rate based on second read errors;
   performing a first adjustment of the tension of the tape media based on the first read error rate; and
   performing a second adjustment of the tension of the tape media based on the second read error rate.

2. The computer program product of claim 1, wherein adjusting the tension comprises either increasing or decreasing the tension.

3. The computer program product of claim 1, wherein the second adjustment of the tension of the tape media is performed in response to determining that the second read error rate is greater than the first read error rate.

4. The computer program product of claim 3, wherein the first adjustment of the tension is in a first direction and wherein the second adjustment of the tension is in a second direction opposite the first direction.

5. The computer program product of claim 4, wherein the first adjustment of the tension is by a first percentage and wherein the second adjustment of the tension in the second direction is by a second percentage greater than the first percentage.

6. The computer program product of claim 1, wherein the operations further comprise:
   determining whether the tape medium has expanded or contracted, wherein the performing the first adjustment and the second adjustment comprises increasing the tension in response to determining that the tape medium has expanded and decreasing the tension in response to determining that the tape medium has contracted.

7. A tape drive assembly for coupling to a tape media having a plurality of tracks, comprising:
   a controller to perform operations, the operations comprising:
      determining a first read error rate based on first read errors;
      determining a second read error rate based on second read errors;
      performing a first adjustment of the tension of the tape media based on the first read error rate; and
      performing a second adjustment of the tension of the tape media based on the second read error rate.

8. The tape drive assembly of claim 7, wherein adjusting the tension comprises either increasing or decreasing the tension.

9. The tape drive assembly of claim 7, wherein the second adjustment of the tension of the tape media is performed in response to determining that the second read error rate is greater than the first read error rate.

10. The tape drive assembly of claim 9, wherein the first adjustment of the tension is in a first direction and wherein the second adjustment of the tension is in a second direction opposite the first direction.

11. The tape drive assembly of claim 10, wherein the first adjustment of the tension is by a first percentage and wherein the second adjustment of the tension in the second direction is by a second percentage greater than the first percentage.

12. The tape drive assembly of claim 7, wherein the operations further comprise:
   determining whether the tape medium has expanded or contracted, wherein the performing the first adjustment and the second adjustment comprises increasing the tension in response to determining that the tape medium has expanded and decreasing the tension in response to determining that the tape medium has contracted.

13. A method for handling errors when reading data on a tape media having a plurality of tracks, comprising:
   determining a first read error rate based on first read errors;
   determining a second read error rate based on second read errors;
   performing a first adjustment of the tension of the tape media based on the first read error rate; and
   performing a second adjustment of the tension of the tape media based on the second read error rate.

14. The tape drive assembly of claim 13, wherein adjusting the tension comprises either increasing or decreasing the tension.

15. The tape drive assembly of claim 13, wherein the second adjustment of the tension of the tape media is performed in response to determining that the second error rate is greater than the first error rate.

16. The tape drive assembly of claim 15, wherein the first adjustment of the tension is in a first direction and wherein the second adjustment of the tension is in a second direction opposite the first direction.

17. The tape drive assembly of claim 16, wherein the first adjustment of the tension is by a first percentage and wherein the second adjustment of the tension in the second direction is by a second percentage greater than the first percentage.

18. The tape drive assembly of claim 13, wherein the operations further comprise:
   determining whether the tape medium has expanded or contracted, wherein the performing the first adjustment and the second adjustment comprises increasing the tension in response to determining that the tape medium has expanded and decreasing the tension in response to determining that the tape medium has contracted.

* * * * *